US010730243B2

(12) United States Patent
Piepenbrock et al.

(10) Patent No.: US 10,730,243 B2
(45) Date of Patent: Aug. 4, 2020

(54) SYSTEM AND METHOD FOR HANDLING A COMPONENT

(71) Applicant: Airbus Operations GmbH, Hamburg (DE)

(72) Inventors: Joachim Piepenbrock, Hamburg (DE); Alexander Engels, Hamburg (DE); Gregor Graßl, Stade (DE); Karsten Gensicke, Potsdam (DE); Klaus Apel, Hauneck (DE)

(73) Assignee: Airbus Operations GmbH, Hamburg (DE)

( * ) Notice: Subject to any disclaimer, the term of this patent is extended or adjusted under 35 U.S.C. 154(b) by 489 days.

(21) Appl. No.: 15/603,010

(22) Filed: May 23, 2017

(65) Prior Publication Data

US 2017/0341309 A1    Nov. 30, 2017

(30) Foreign Application Priority Data

May 24, 2016 (EP) .................................. 16171077

(51) Int. Cl.
*B29C 65/78* (2006.01)
*B29C 65/00* (2006.01)
(Continued)

(52) U.S. Cl.
CPC ......... *B29C 65/7841* (2013.01); *B25J 13/085* (2013.01); *B25J 15/0066* (2013.01);
(Continued)

(58) Field of Classification Search
CPC .......... B29C 65/7841; B29C 66/82423; B29C 31/008; B29C 66/863; B29C 65/483; B25J 15/022; B25J 15/0616
See application file for complete search history.

(56) References Cited

U.S. PATENT DOCUMENTS 5,283,937 A    2/1994 Uesugi
2017/0066143 A1*   3/2017 Hantzschel ............. B23P 19/04

FOREIGN PATENT DOCUMENTS

DE     202014101000 U1    6/2015

OTHER PUBLICATIONS

European Patent Office, Extended European Search Report for Application No. 16171077.7-1706 dated Nov. 18, 2016.

* cited by examiner

*Primary Examiner* — Christopher T Schatz
(74) *Attorney, Agent, or Firm* — Jenkins, Wilson, Taylor & Hunt, P.A.

(57) ABSTRACT

A system for handling a first component includes: a main-device and a module-device, the module-device having a pressing section arranged to form an outer surface of the module-device, the module-device configured to releasably receive the first component, such that a connection section of the first component is attachable to the pressing section of the module-device. The module-device is releasably connected to a second component, wherein the main-device includes a grabbing unit adapted for releasably connecting the module-device, such that the pressing section is arranged to form a first outer surface section of the main-device, and wherein the main-device includes a connector for connecting to a handling-unit for arranging the main-device at the second component, such that the connection section of the first component, if attached to the pressing section of the module-device, is at least indirectly attachable to a front surface of the second component.

10 Claims, 6 Drawing Sheets

(51) Int. Cl.
   *B25J 13/08* (2006.01)
   *B25J 15/00* (2006.01)
   *B25J 15/06* (2006.01)
   *B29C 65/48* (2006.01)
   *B25J 15/02* (2006.01)
   *B29C 31/00* (2006.01)
   *B64F 5/10* (2017.01)
   *B29C 65/56* (2006.01)
   *F16B 11/00* (2006.01)
   *B29K 307/04* (2006.01)
   *B29K 309/08* (2006.01)

(52) U.S. Cl.
   CPC ......... *B25J 15/022* (2013.01); *B25J 15/0616* (2013.01); *B29C 31/008* (2013.01); *B29C 65/483* (2013.01); *B29C 65/4805* (2013.01); *B29C 65/565* (2013.01); *B29C 66/1122* (2013.01); *B29C 66/474* (2013.01); *B29C 66/721* (2013.01); *B29C 66/82423* (2013.01); *B29C 66/863* (2013.01); *B64F 5/10* (2017.01); *B29C 65/7847* (2013.01); *B29C 66/9241* (2013.01); *B29K 2307/04* (2013.01); *B29K 2309/08* (2013.01); *F16B 11/006* (2013.01)

SYSTEM AND METHOD FOR HANDLING A COMPONENT

CROSS-REFERENCE TO RELATED APPLICATION

This application claims the benefit of, and priority to, European patent application number EP 16171077.7, filed May 24, 2016.

TECHNICAL FIELD

Embodiments of the subject matter described herein relate to a system for handling a first component and to a method for connecting a first component to a second component.

BACKGROUND

In the past, particular attention has been paid to the assembly of products by fibre-reinforced components. Usually, fibre-reinforced components are produced before they are assembled together in order to form a new product. For connecting a first fibre-reinforced component with a second fibre-reinforced component, a connection section of the first fibre-reinforced component is applied with an adhesive layer. Thereafter, the fibre-reinforced component is attached to the second component, such that the connection section of the first component, wherein the adhesive layer being applied to the connection section of the first component, is attached to the surface of the second component. In order to reach a reliable, firmly bonded connection between the first component and the second component by use of the adhesive layer, the first component has to be precisely positioned relative to the first component. Further, the first component has to be pressed with its connection section onto the surface of the second component, wherein the first component and the second component have to remain positioned to each other, such that the first component remains position-unchanged to the second component, such that the adhesive layer remains arranged between the connection section of the first component and the surface of the second component to be fully cured. In practice, a pressure between 0.4 and 0.6 bar has to be applied to the connection section towards the surface of the second component in order to reach a sufficient contact between the connection section of the first component and the surface of the second component by way of the adhesive layer. Said pressure is necessary, in order to ensure that the whole connection section and the corresponding surface area of the surface of the second component are in contact with the adhesive material of the adhesive layer and further, in order to prevent any air and/or gas encapsulation at boundary areas at the adhesive layer.

Furthermore, the explained position of the first component relative to the second component has to remain unchanged until the adhesive layer is fully cured. In practice, the first component may have to remain for more than 3 hours, for example for 5 hours, in said position relative to the second component, until the adhesive material of the adhesive layer is fully cured.

In practice, the second component is attached with its back surface to a support surface of a support device, wherein the support surface prevents any bending of the second component in a direction towards the support surface of the support device. Thereafter, the first component is attached to the front surface of the second component. Thus, by providing full support for the back surface of the second component by the support device, the connection section of the first component could have been pressed against the front surface of the second component without fearing a deflection of the second component. Furthermore, a handling device was needed, being configured to position the first component with its connection section, while an adhesive layer was attached to the connection section, to the front surface of the second component. Moreover, the handling device was configured to press the first component with the necessary pressure against the second component and was further necessarily configured to hold the first component in place in order to remain in the position between the components. In practice, the handling device had to remain in this position for several hours, for example 3 to 5 hours, in order to fully cure the adhesive material of the adhesive layer. The handling device could not have been detached earlier from the first component. Otherwise a losing or relaxing of the first component relative to the second component could have be feared, as the adhesive material is not fully cured.

As a result, the handling unit was not available for connecting a further first component to the second component. Thus, in case a number of first components are supposed to be firmly connected to the second component, a respective number of handling units were necessarily needed, in order to provide a respective product within a preferably short time period.

BRIEF SUMMARY

One object of the present disclosure may be to propose a system and/or a method, which may be used to establish a sequence of firmly bonded connections between components within a preferably short time period.

According to a first aspect of the present disclosure, the above provided object is solved by a system comprising the features of independent claim 1. Preferred embodiments of the system, preferred features of the system, advantages and/or effects may be provided in the following description.

A system according to an embodiment of the present invention comprises a main-device and a module-device. The module-device comprises a pressing section being arranged to form an outside surface of the module-device. The module-device is adapted for releasably receiving the first component, such that a connection section of the first component is releasably, in particular planar, attachable to the pressing section of the module-device. The module-device is further configured to be releasably connected to a second component. The main-device comprises a grabbing unit. The grabbing unit is adapted for releasably connecting the module-device, such that the pressing section is arranged to form a first outer surface of the main-device. The main-device further comprises a connector, in particular a connector plate. The connector is adapted for being connected to a handling-unit. The handling-unit may be a robot. The handling-unit may be configured to arrange the main-device at the second component, such that the connection section of the first component, if attached to the pressing section of the module-device, is at least indirectly attachable to a front surface of the second component.

Thus, the module-device is adapted for releasably receiving the first component. The first component may have a plate shape, at least at its connection section. Further, the first component may comprise a main body section, which may also have a plate shape. Further, the first component may comprise a flange. The flange may be arranged with respect to the main body section in order to provide an L-form or T-form cross-section. Thus, the flange preferably forms the connection section of the first component. Preferably, an adhesive layer is applied at a front surface of the connection section, wherein the front surface preferably faces away from the main body section of the first component. In order to releasably attach the first component to the module-device, a back surface of the connection section, thus a surface opposite to the front surface of the connection section, is releasably attached to the pressing section of the module-device. The main body section may be arranged at a receiving area of the module-device. The shape of the pressing section preferably corresponds to the shape of the back surface of the connection section. As a result, the connection section, and in particular its back surface, may be fully, extensively or at least with a large portion thereof brought into direct contact with the pressing section in order to be releasably attached to the pressing section. Preferably, the pressing section is formed, such that at least 60%, at least 70%, at least 80%, least 90% or 100% of the back surface of the connection section is in direct contact with the pressing section when releasably attaching the connection section of the first component to the pressing section of the module-device. As a result, the connection section may be attached planar to the pressing section of the module-device. As an effect, the pressing section of the module-device may provide a stable and/or robust support for the connection section of the first component, in order to prevent a deformation of the connection section when handling the first component with the module-device.

The module-device may be releasably connected to the main-device. Thus, the module-device may serve as a module, in particular a replaceable module, for the main-device. The main-device comprises a grabbing unit. The grabbing unit is configured and/or adapted for releasably grabbing and/or connecting the module-device to the main-device. As a consequence, the module-device may be releasably connected to the main-device. While being releasably connected to the main-device, the pressing section of the module-device is arranged to form a first outer surface section of the main-device. In case the connection section of the first component is releasably attached to the pressing section of the module-device, the connection section, instead of the pressing section, will consequently form the first outer surface section of the main-device. In this case, the connection section of the first component is freely accessible from outside of the main-device in order to be attached to the front surface of the second component.

The main-device further comprises a connector, which is in particular being formed by a connecting plate. The connector may be attached to a handling-unit, which may in particular be a robot. Thus, the robot may be attached to the connector in order to handle the main-device. In case the first component is attached with its connection section to the pressing section of the module-device and if the module-device is releasably connected to the main-device, by handling the main-device the module-device and the first component may be handled, too.

Preferably, the main-device may be handled by the handling-unit, such that the connection section of the first component, if attached to the pressing section of the module-device, and if the module-device is releasably connected to the main-device, is at least indirectly attached to a front surface of the second component. In case an adhesive layer is applied to the front surface of the first component, the connection section of the first component may be applied with the adhesive layer to the second component. Thus, when attaching the first component with the connection section to the front surface of the second section, the adhesive layer will be arranged and/or forming the contact between the connection section of the first component and the front surface of the second component.

However, in order to receive a reliable firmly bonded connection between the first component and the second component, the connection section of the first component has to be pressed against the front surface of the second component and further, the components have to remain in place until the adhesive layer is fully cured. Pressing the first component with its connection section in direction to the front surface of the second component may be performed by way of the handling-unit, the main-device and the module-device, as they are preferably releasably connected in series. For instance, a force provided by the handling-unit may cause a pressure between the connection section of the first component and the front surface of the second component.

In order to use the main-device for further purpose, the module-device is configured to be releasably connected to the second component. Accordingly, the module-device may provide a configuration, which may be used in order to connect the module-device itself to the second component. If such a releasable connection is provided, the module-device may provide a stable and/or reliable basis in order to hold the first component in place relative to the second component, as it has been explained and/or required before in order to receive a reliable, firmly bonded connection between the first component and the second component.

After releasably connecting the module-device to the second component, the main-device may be disconnected from the module-device and moved away from the module-device. The module-device as such may remain releasably connected to the second component and therefore may be hold by the second component. Moreover, as the main-device is now free to be used for further purpose, the main-device may be driven to a further module-device, in order to releasably connect to the further module-device by way of the grabbing unit of the main-device. The further module-device may be a duplicate of the previously explained module-device. Thus, the main-device and the releasably connected further module-device may be used in order to attach a further first component to the second component. If this has been carried out, the further module-device may be releasably connected to the second component, too. In this case, already two module-devices are connected to the second component, wherein each module device holds a respective first component in place with respect to the same second component. The main-device may also be disconnected from the further module-device, in particular by opening the grabbing unit. Thus, the module-device may be moved away from the further module-device by the handling-unit, in particular in order to repeat the use of the main-device for an even further module-devices in order to connect even further first components to the second component. Thus, the system may comprise a, in particular single, main-device and a plurality of module-devices.

As an effect, the system comprises a main-device which may be releasably connected to a module-device one after the other. Each time a module-device is releasably connected to the main-device, the respective module-device may have releasably received the first component, as described above. Thus, the main-device may be handled by the handling-unit, such that the connection section of the first component is connected to the second component, in particular by way of the adhesive layer, while the module-device remains at the second component, as it may be releasably connected thereto. As a consequence, the main-device, and in particular the handling-unit, may be used for connecting a plurality of the first components and a plurality of module-devices to the second component. The module-devices may serve, when being connected to the second component, for holding the respective number of first components in place with respect to the second component. This ensures, that reliable, firmly bonded connections may be formed between the second component and the first components. This may take several hours. However, the curing process may take place for the respective number of adhesive layers at least partly in parallel. Thereafter, the main-device may be used to remove the module-devices from the second component. As a result, a new constructed product may be provided comprising the second component and several firmly attached first components thereto.

According to a preferred embodiment of the system, the system comprises a handling-unit. The may comprise the previously described features and/or be configured to provide the above provided advantages or effects explained in the context of the handling-unit. The handling-unit may be a robot. Preferably, the robot is a stationary robot. The robot may comprise a robot-arm. The end section of the robot arm may be configured to connect to the connector of the main-device. Thus, the handling-unit, and in particular the robot, may be configured to move and/or drive the main-device. The handling-unit may comprise a control unit having stored a program for handling the main-device. Thus, the handling-unit may be configured to move and/or drive the main-device according to a predefined motion trajectory, represented by the stored program. Thus, the main-device may to be moved by the handling-device to a module-device, in order to releasably connect to the main-device to the module-device. If the first component has been releasably connected to the module-device in advance, in particular such that the connection section of the first component is releasably attached to the pressing section of the module-device, the main-device may be releasably connected to the module-device, such that the module-device, and therefore also the first component, may be moved by the main-device and the handling-unit. Further, the handling-unit may be configured for arranging the main-device opposite to the second component. Further, the handling-unit may be configured, such that the movement for arranging the main-device with respect to the second component may be performed, such that the pressing section of the module-device is at least indirectly attached to a front surface of the second component. Thus, the handling-unit may be configured to arrange the main-device opposite to the second component, such that the connection section, having the adhesive layer on top, is attached to the front surface of the second component. Furthermore, the handling-unit may be configured to press the main-device in direction towards the front surface of the second component, such that the module-device is also pressed in the direction towards the front surface of the second component. Thus, the handling-unit may be configured to press the connection section of the first component, in particular while the adhesive layer is attached to the connection section, against the front surface of the second component. This ensures that the adhesive layer provides an adhesive connection between the connection section of the first component and the front surface of the second component. Further, the handling-unit may be configured to limit the force for pressing the main-device, and in particular indirectly pressing the module-device and the first component as a result thereof, against the front surface of the second component. This force-limitation provides the advantage, that the second component receives just a limited force or pressure in a direction normal to the front surface of the second component. Thus, a high deflection of the second component may be prevented. As an effect, a continuous and/or planar connection between the connection section of the first component and the front surface of the second component may be ensured by the adhesive layer. In order to increase the pressure provided to the connection section of the first component, a sufficient support for the back surface of the second component, being opposite to the front surface of the second component, would be needed. However, such a support may have to be sufficiently stiff and therefore lacks flexibility with regard to different forms of the second component.

According to a further preferred embodiment of the system, the main-device comprises a driving unit and the module-device comprises a clamping arm. Further, the module-device comprises an actuation unit being connectable, controllable and/or drivable by the driving unit. Furthermore, the actuation unit is adapted to swivel the clamping arm at least between a first position and a second position. In the first position, the clamping arm preferably encloses the pressing section, such that at least a part of the clamping arm is arranged in overlap with the pressing section. In the second position, the clamping arm preferably uncovers the pressing section, in particular for attaching the connection section of the first component, if attached to the pressing section, at least indirectly to the front surface of the second component. After releasably connecting the first component to the module-device, such that the connection section of the first component is releasably, in particular planar, attached to the pressing section of the module-device, the module-device may be releasably connected to the main-device by the grabbing unit. The grabbing unit releasably connects the module-device, such that the pressing section or the connection section, if attached to the pressing section, is arranged to form a first outer surface section of the main-device. Thus, the pressing section or the connection section of the first component is accessible from outside. According to the preferred embodiment of the system as described above, the module-device comprises at least one clamping arm. Preferably, the module-device comprises at least two clamping arms. It is further preferred, that each clamping arm is pivotable attached to a section of the module-device being arranged lateral and/or below the pressing section. Thus, each clamping arm may be swiveled or pivoted between a respective first position and respective second position. In the following context, swiveling a clamping arm may also refer to a pivoting of the clamping arm. Further, the swivel movement is described in the following for one clamping arm. In case the module-device comprises more than one clamping arm, the following explanation may also refer in an analogous manner to each clamping arm. If the clamping arm is swiveled to its first position, the clamping arm may encompass the pressing section. In case the connection section of the first component is releasably attached to the pressing section, the clamping arm may encompass the connection section of the first component when being in its first position. In the first position, at least a part of the clamping arm is preferably arranged in overlap with the pressing section or the connection section, respectively. Thus, at least the part of the clamping arm may be swiveled, such that this part of the clamping arm is above the pressing section or the connection section, respectively. If the clamping arm is swiveled to its second position, the clamping arm may uncover the pressing section or the connection section, respectively. Thus, the pressing section or the connection section, respectively, is accessible from outside. Further, if the clamping arm is in its second position, the module-device may be arranged with its pressing section opposite to the front surface of the second component. If the first component is releasably attached to the module-device, such that the connection section of the first component is at least releasably attached to the pressing section, the connection section of the first component may be arranged opposite to the front surface of the second component. In other words, by uncovering the pressing section or the connection section, respectively, the module-device may be moved towards the front surface of the second component, such that the connection section of the first component may be brought at least indirectly in contact with the front surface of the second component. It is to be noted, that the connection section of the first component preferably comprises an adhesive layer. Thus, when attaching the connection section of the first component to the front surface of the second component, the connection section of the first component is brought into contact by way of the adhesive layer with the front surface of the second component. If the connection section of the first component is attached to the front surface of the second component, the clamping arm may be swiveled into the first position. As the connection section of the first component is attached to the second component, the clamping arm encompasses the second component, such that the connection section of the first component and the second component are arranged between the pressing section of the module-device and the clamping arm, or its at least one part thereof. Further, the clamping arm may be swiveled into the first position, such that the connection section of the first component is pressed against the front surface of the second component. This provides the effect, that the first component may be hold in place with respect to the second component by way of the module-device, in particular by the clamping arm. In this state, the module-device, and in particular its pressing section, serves as a basis for the supporting the first component, while the module-device is clamped by the clamping arm to the second component, resulting in a clamping the module-device to the second component. Thus, the module-device is configured to being clamped to the second component while holding the first component, and in particular its connection section, in place with respect to the second component, such that the connection section of the first component is attached, in particular by an adhesive layer, to the front surface of the second component. Further, the module-device comprises an actuation unit. The actuation unit may be formed by a link mechanism, in particular providing at least one joint between at least two arm elements. Thus, the actuation unit may be configured to drive the at least one clamping arm. Further, the actuation unit may be pivotably connected to the clamping arm, such that the clamping arm may be driven by the actuation unit to swivel at least between the first position and the second position. Further, due to said preferred connection between the actuation unit and the clamping arm, the clamping arm is controllable and/or drivable by the actuation unit. However, the actuation unit may not comprise an own driving unit. Thus, the actuation unit is preferably connectable to the driving unit of the main-device. That connection may be established, when the module-device is connected to the main-device by the grabbing unit. Thus, the driving unit may drive and/or control the actuation unit. This provides the advantage, that the module-device may be particularly compact and/or of low complexity. The driving unit of the main-device may be an electronic driving unit, a hydraulic driving unit and/or a pneumatic actuation unit. Thus, when driving the actuation unit by the driving unit, the driving unit may also indirectly drive and therefore control the clamping unit. Accordingly, the driving unit may control the clamping arm at least indirectly in order to drive the clamping arm at least between its first position and its second position.

According to a preferred embodiment of the system, the driving unit of the main-device and the actuation unit of the module-device are adapted, such that the actuation unit releasably connects to the driving unit for driving the actuation unit, when the module-device is releasably connected to the main-device. As a result, the driving unit may be automatically connected to the actuation unit, when the module-device is releasably connected to the main-device. Thus, after connecting the module-device using the grabbing unit of the main-device to the main-device, a respective mechanical connection may be established between the driving unit and the actuation unit. Thereafter, the driving unit may drive and/or control the actuation unit, and based thereon may be at least indirectly drive and/or control the clamping arm, in order to swivel the clamping arm at least between its first and/or second position. In order to provide this automatic connection between the actuation unit and the driving unit, the driving unit and the actuation unit may comprise correspondingly adapted connection elements, which may connect to each other, when releasably connecting the module-device to the main-device. Further, said connection between the actuation unit and the driving unit may further be established with assistance of the grabbing unit. Thus, the grabbing unit may further be configured for establishing the releasable connection between the driving unit and the actuation unit. Furthermore, the driving unit of the main-device and the actuation unit of the module-device may be adapted, such that the actuation unit disconnects from the driving unit, when disconnecting the module-device from the main-device. This disconnection may be performed automatically, when the module-device is disconnected from the main-device. Reference is made to the previously provided explanations, preferred features, effects and/or advantages in an analogous manner for the disconnection of the actuation unit from the driving unit. Since the connection between the actuation unit and the driving unit may be automatically established or interrupted, in particular by disconnecting, the usage of the main-device may be increased, since the main-device may be used for several module-devices successively, such that a number of first components may be attached by its connection section at least indirectly to the front surface of the second component in a respective sequence.

According to a preferred embodiment of the system, the actuation unit is configured for locking, in particular self-locking, the clamping arm in its first position. Thus, if the connection section of the first component is at least indirectly attached to the front surface of the second component, the clamping arm may be swiveled to its first position, such that the clamping arm encompasses the second component and/or such that the second component and the connection section of the first component are arranged between the pressing section of the module-device and the clamping arm. As the clamping arm may be locked in its first position, the module-device may remain clamped to the second component, even if the main-device would be disconnected from the module-device thereafter. Thus, the main-device may be disconnected from the module-device, in particular by way of the grabbing unit of the main-device, while the module-device remains in place in order to hold the connection section in position to the front surface of the second component. If the connection section of the first component and the front surface of the second component are brought into contact by an adhesive layer, the module-device may remain clamped to the second component until the adhesive layer is fully cured, in order to provide a firmly bonded connection between the connection section of the first component and the second component. Such curing process may require a long time period, in particular several hours. Therefore, it is preferred, that the actuation unit is configured for self-locking the clamping arm in its first position. This provides the effect, that the module-device may be clamped to the second component during the whole curing process of the adhesive layer. After clamping the module-device to the second component, the main-device may be disconnected from the module-device. Thereafter, the main-device may be used to releasably connect to a further module-device. In this context, reference is made in an analogous manner to the above provided explanations, preferred embodiments, effects and/or advantages. Thus, the further module-device may be clamped in an analogous manner to the previously explained module-device to the second component. This provides the effect, that a further first component may be attached to the second component and thereafter being hold in place with respect to the second component, such that the respective adhesive layer may be fully cured in order to provide a firmly bonded connection between the further first component and the second component. As a result, the main-device and a plurality of module-devices may be used in order to produce a new product comprising the second component and a plurality of first components, each being firmly bonded to the second component. Furthermore, a precise alignment of each of the first components relative to the second component may be ensured, since a respective module-device may be used for each of the first components in order to hold the respective first component in place with respect to the second component while the respective adhesive layer is fully cured. Thereafter, the main-device may be used to connect to each of the module-devices, one after the other, in order to swivel the clamping arm of each of the module-devices to the second position, such that the module-device may be disconnected from the respective first component, now being firmly attached to the second component. After disconnecting each of the module-devices from the respective number of first components, the new product, comprising the second component and the plurality of first components being firmly attached to the second component, may be used for further purpose.

According to a preferred embodiment of the system, the main-device comprises a vacuuming unit, in particular a vacuum cap. The vacuuming unit comprises an air connection port. The air connection port is providable with a vacuum air pressure. The vacuuming unit is adapted to suck onto the front surface of the second component. This is in particular the case, when a sealing surface of the vacuuming unit is attached to the front surface of the second component and a vacuum air pressure is applied to the air connection port. Thus, if the main-device is brought into a position opposite to the front surface of the second component, the vacuuming unit may be attached to the front surface of the second component by its sealing surface. The sealing surface may be a sealing surface of a vacuum cap, which is preferably provided by the vacuuming unit. The vacuum cap may be in fluid connection with the air connection port of the vacuuming unit. Thus, when applying a vacuum air pressure to the air connection port, air is sucked off an area encompassed by the vacuuming unit. If the vacuuming unit is attached with its sealing surface to the front surface of the second component, a vacuum air pressure is established in a space enclosed by the vacuum cap and the front surface of the second component. In other words, the vacuuming unit may be sucked onto the front surface of the second component, if the sealing surface of the vacuum cap is attached to the front surface of the second component and a vacuum air pressure is applied to the air connection port. Preferably, the vacuuming unit comprises a plurality of vacuum caps, wherein the air connection port is in fluid connection with the area encompassed by each of the vacuum caps. Each vacuum cup comprises a respective sealing surface. Thus, the vacuuming unit may comprise a plurality of sealing surfaces. By applying the vacuum air pressure to the air connection port, and if each of the vacuum caps are attached by their respective sealing surface to the front surface of the second component, each of the vacuum caps may be sucked onto the front surface of the second component. As a result, a force-fit connection may be provided between the main-device, or its vacuuming unit, and the second component. This force-fit connection may be established by applying the vacuum air pressure to the air connection port and released by disapplying the vacuum air pressure, or by applying an atmospheric air pressure, to the air connection port. The vacuum air pressure is preferably a pressure below the ambient pressure. The explained embodiment of the system provides the advantage, that the main-device may be releasably connected by a force-fit connection to the second component, which allows to provide a robust basis in order to press the module-device in a direction towards the front surface of the second component and/or the press the connection section of a first component, being preferably releasably connected and/or attached to a pressing section of the module-device, towards the front surface of the second component. Thus, pressing the connection section of the first component at and/or towards the front surface of the second component may be carried out by means of and/or with the assistance and/or help of the vacuuming unit of the main-device. As a result, a support device for holding the second component does not have to be particular stiff in order to prevent a bending or deflection of the second component, as the main device itself may absorb any reaction force caused from pressing the connection section of the first component against the front surface of the second component. Thus, a particular stiff and heavy support device for the second component may be prevented. Further, the vacuuming unit, in particular due to its vacuum cups, may provide the flexibility to releasably attach to different or arbitrary geometrical forms of the front surface of a second component. Thus, the main-device and thus the system may be used for connecting to different second components, in particular without any further adaptation.

According to a further preferred embodiment of the system, the main-device comprises a pressing unit. The pressing unit is preferably adapted for pressing the module-device with its pressing section facing forward in a pressing direction away from the main-device. The pressing direction may be directed towards, and in particular normal to, the front surface of the second component. Thus, the pressing unit may be adapted for pressing the pressing section and/or the connection section of the first component towards the front surface of the second component. If the main-device is connected in a force-fit by way of the vacuuming unit to the second component, a force applied by the pressing unit for pressing the module-device away from the main-device towards the second component may not result in a reaction force applied to the connector of the main-device and/or a support device for holding the second component. Instead, the support device for holding the second component and/or the connector, and in particular a handling-unit connected thereto, may not be subject to said reaction force. Thus, pressing the module-device towards the front surface of the second component may result just in forces applied to the second component, the main-device, the module-device and the first component. As a result, a force for pressing the connection section of the first component at least indirectly to the front surface of the second component does not need to be provided by the handling-unit. Furthermore, as the main-device may be connected in a force-fit manner to the second component by the vacuuming unit, in particular comprising a plurality of vacuum caps, which attach parallel and/or close to the connection section to the first component to the front surface of the second component, a deflection of the second component may be prevented or reduced to a minimum. As a further result thereof, the support device for holding the second component does not necessarily need to be formed, such that it would provide a planar support surface correspondingly formed to a back surface of the second component. Instead, the support device may be adapted for holding the second component at several sections, in particular at the back surface of the second component. As a further advantage of assigning the pressing unit to the main-device, the module-device or each module-device may be of a low complexity and/or of low weight. Thus, when clamping a module-device to the second component by the clamping arm, an influence of the weight of the module-device to the second component may be reduced to a minimum.

According to a further preferred embodiment of the system, the main-device comprises a sensor. The sensor is configured for at least indirectly detecting a force, which may be applied by the pressing unit to the module-device. Thus, the sensor may be configured for at least indirectly detecting a force representing the pressure applied to the connection section of the first component when being attached at least indirectly to the front surface of the second component. In practice, the force being subject to the module-device and/or the connection section of the first component may have to be within certain limits. Thus, the sensor may be used in order to control the force applied to the pressing section of the module-device and/or the connection section of the first component, in order to be in a range predefined by an upper force limit and a lower force limit.

According to a further preferred embodiment of the system, the system comprises a control unit, which is connected via a signal connection to the sensor. The sensor is configured to transmit a sensor signal, representing a detected force, to the control unit. Further, the control unit is configured to control the pressing unit based on the sensor signal. As a result, a closed loop control may be provided in order to control the force applied by the pressing unit of the module-device to the connection section of the first component. For this purpose, the sensor transmits the sensor signal, representing a force detected by the sensor, to the control unit. Thus, the control unit receives the information about the actual force applied. Based on the sensor signal, and therefore based on the detected force, the control unit may control the pressing unit, in particular such that actual force applied to the pressing section of the module-device and/or to the connection section of the first component may be controlled, such that a reliable, firmly bonded connection between the first component and the second component may be achieved.

According to a preferred embodiment of the system, the control unit is configured to control the pressing unit, such that the detected force corresponds to a predefined reference force. In particular, if the control unit has stored the reference force, and/or if the control unit receives a further signal representing the reference force, the control unit may control the pressing unit, such that the actual force applied by the pressing unit corresponds to the reference force. The reference force may be predefined. The reference force may be predefined based on the information about the material and/or geometrical parameters of the first and/or second component. As a result, the force applied to the pressing section of the module-device and/or to the connection section of the first component may be controlled, such that a reliable, firmly bonded connection between the first component and the second component may be achieved.

According to certain embodiments of the present invention, the above provided object of the present invention is solved by a method for connecting a first component to a second component by way of a system comprising a main-device, having a grabbing unit, and a module-device, having a clamping unit and a pressing section. The method comprises the following steps:

a) Connecting the first component to the module-device, such that a connection section of the first component is, in particular planar, attached with its back surface to the pressing section of the module-device, wherein an adhesive layer is applied at a front surface of the connection section facing away from the pressing section,
b) Coupling the module-device to the main-device by its grabbing unit, such that the adhesive layer attached to the connection section of the module-device forms a first outer surface section of the main-device,
c) Positioning the main-device relative to the second component, such that the adhesive layer attached to the connection section of the first component is opposite to a front surface of the second component,
d) Connecting the first component to the second component, such that the front surface of the connection section of the first component, having the adhesive layer applied to, is attached to a front surface of the second component,
e) Swiveling the clamping arm of the module-device, such that the clamping arm encompasses the second component and releasably attaches to a back surface of the second component,
f) Decoupling of the module-device from the main-device by its grabbing unit,
g) Curing the adhesive layer, such that the first component is firmly bonded to the second component,
h) Coupling the module-device to the main-device by its grabbing unit, after the adhesive layer is cured,
i) Retracting the clamping arm, such that the module-device is released from the second component,
j) Detaching the module-device from the first component, and
k) Moving the main-device in a direction away from the bonded components.

It is understood that, without repeating here all the explanations, examples, features and/or advantages provided with reference to the device according to the first aspect of the present disclosure and/or their preferred embodiment referring thereto, the exemplary method is intended to be configured to carry out the method steps for which the respective device is configured to. Thus, all the above examples, explanations, features and/or advantages, although previously provided with reference to the device and/or their preferred embodiments according to the first aspect of the present disclosure, are also to be intended as being provided in an analogous manner for the method.

As a result, a plurality of first components may be connected in a series sequence to the second component, such that each respective adhesive layer provides a connection layer between the connection section of the respective first component and the front surface of the second component. As a separate module-device may be used for each first component, a plurality of first components may be hold in place exactly with respect to the second component, in order to provide exact and reliable firmly bonded connections between the first components and the second component. Thereafter, each of the module-devices may be detached, one after the other, from the respective first components by the main-device. For this procedure, the main-device may be coupled in a series sequence to each of the module-devices subsequently, in order to subsequently detaching the module-devices. As a further result, a single main-device and a plurality of module-devices may be used, in order to firmly bond a plurality of first components to the second component, while ensuring an exact and reliable connection between the first components and the second component.

According to a preferred embodiment of the method, the method comprises the further step of attaching a vacuuming unit of the main-device to the front surface of the second component, wherein the vacuuming unit sucks onto the front surface of the second component, such that a force-fitted connection is formed between the main-device and the second component. Reference is made in an analogous manner to the respective explanations, features, effects and/or advantages provided with the respective embodiment of the device explained previously.

According to a further preferred embodiment of the method, the method comprises the further step of pressing the module-device off the main-device towards the front surface of the second component, such that the first component connects to the second component. Reference is made in an analogous manner to the explanations, examples, features, effects and/or advantages provided with the respective embodiment of the device as explained previously.

According to a further preferred embodiment of the method, the method comprises the further step of controlling the force applied to the module-device while pressing it towards the second component. Thus, a force corresponding to a predefined or reference force may be applied to the module-device while being pressed towards the second component. Reference is made in an analogous manner to the explanations, examples, features, effects and/or advantages provided with the respective embodiment of the device as explained previously.

According to a further preferred embodiment of the method, the method further comprises the step of applying heat to the adhesive layer, in particular by heating the pressing section of the module-device. Heating the adhesive layer may reduce the time for curing the adhesive layer. For this purpose, the module-device may comprise a heater, which is configured to heat the pressing section. When heating the pressing section, heat is provided to the connection section of the first component and therefore indirectly provided to the adhesive layer. Thus, the time for producing a product comprising the second component and at least one first component, in particular a plurality of first components, may be reduced.

According to a further preferred embodiment of the method, the method is characterized in repeating the steps a) to g) of the method, and in particular at least on further step as described above, for each of a plurality of first components, when a separate module-device is used for each of the first components. Reference is made in an analogous manner to the explanations, examples, features, effects and/or advantages provided with the respective to the device and its preferred embodiments as explained previously.

According to a further preferred embodiment of the method, the method steps h) to k), and in particular at least on further step as described above, are repeated for each of the module-devices. Reference is made in an analogous manner to the explanations, examples, features, effects and/or advantages provided with the respective to the device and its preferred embodiments as explained previously.

Additional features, advantages and/or possible applications of the present invention may be gained from the following description of the exemplary embodiments and the figures. All described and/or graphically described features here constitute the subject-matter of the present invention either taken separately or in any combination, even independently of their composition in the individual claims or back references thereto. Furthermore, the same reference signs in the figures denote the same or similar objects.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the following, embodiments of the invention are exemplarily described as being used in the context of the system 2. But an embodiment of the invention may also be used in the context of the method in an analogous manner.

Figure 1:
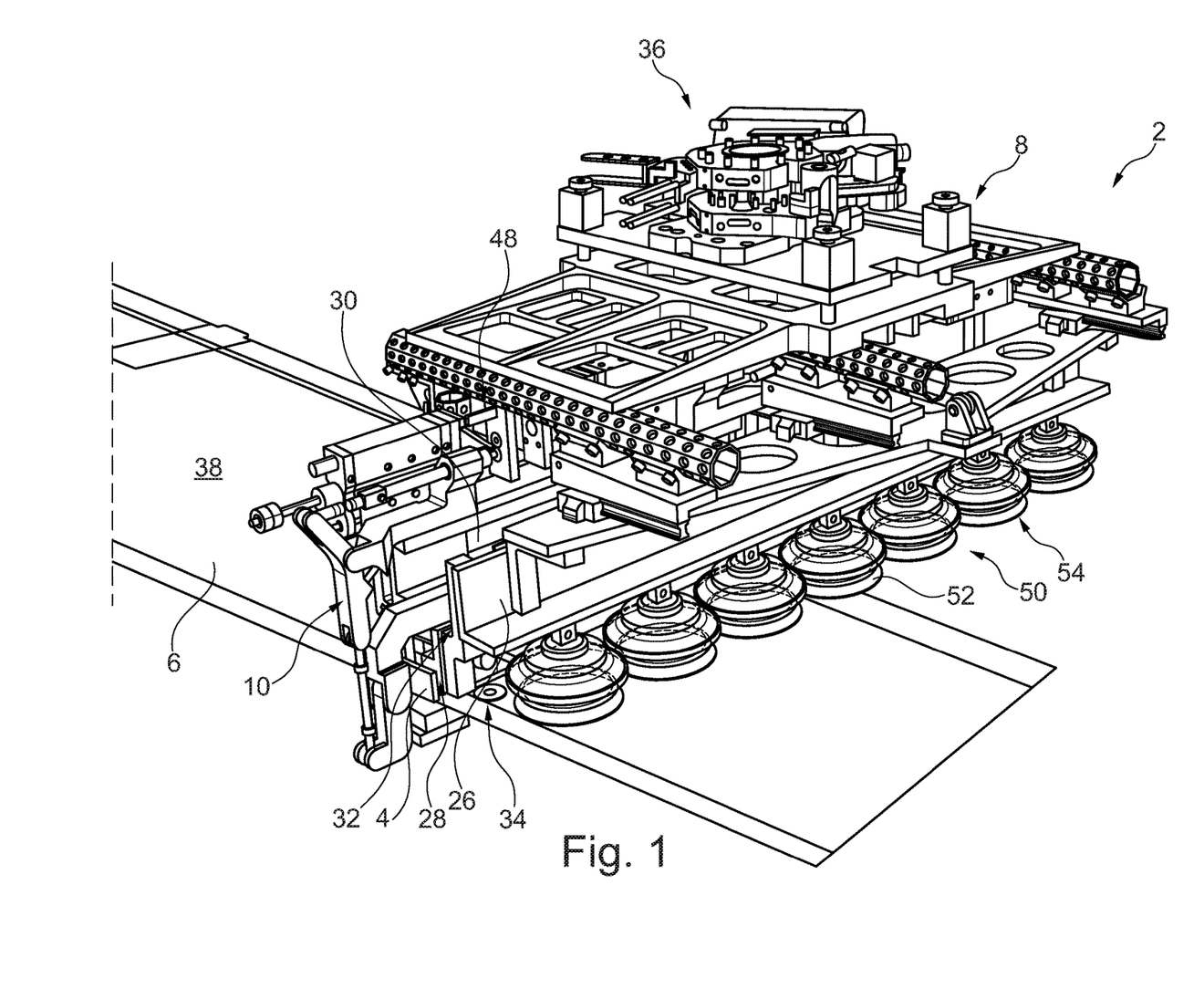
FIG. 1 schematically illustrates an embodiment of the system.

FIG. 1 schematically illustrates a system 2. The system 2 is configured for handling a first component 4. The system 2 may be used for attaching and/or connecting the first component 4 to a second component 6. For this purpose, the system 2 comprises a main-device 8 and at least one module-device 10. Preferably, the system 2 comprises a plurality of module-devices 10. Before describing the system 2 in further detail, an example of a first component 4 should be described.

Figure 2:
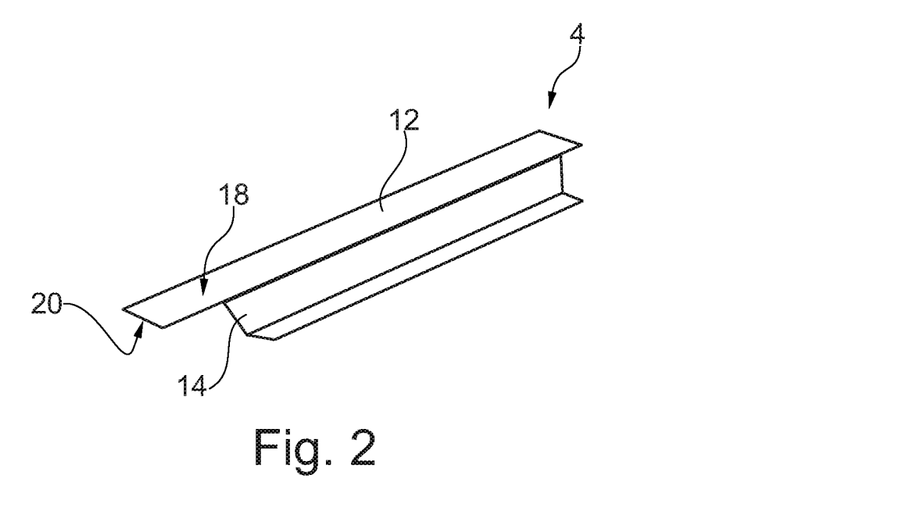
FIG. 2 schematically illustrates an embodiment of the first component.

FIG. 2 schematically illustrates an example of the first component 4. The first component 4 may be made of fibre-reinforced material. The fibres may be glass fibres and/or carbon fibres. Accordingly, the first component 4 may be a glass- and/or carbon-fibre-reinforced component. The first component 4 comprises a connection section 12. Further, the first component 4 may comprise a main section 14. The connection section 12 of the first component 4 may serve as a basis for connecting the first component 4 to the second component 6, as exemplarily shown in FIG. 1. The connection section 12 of the first component 4 may be arranged in an oblique angle to the main section 14. The main section 14 of the first component 4 may serve for further purpose. Thus, the main section 14 may be used to increase the stiffness of the second component 6. Further, the main section 14 may serve as a basis for connecting the first component 4, and thus the second component 6 indirectly, to an even further component.

Figure 3:
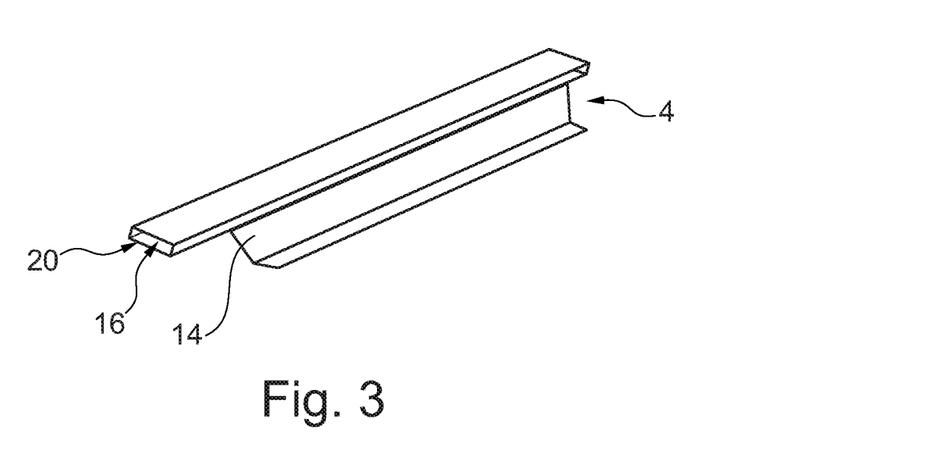
FIG. 3 schematically illustrates a further embodiment of the first component.

In order to firmly bond the first component 4 to the second component, an adhesive layer 16 is applied to a front surface 18 of the connection section 12 of the first component 4. FIG. 3 shows schematically the first component 4 while the adhesive layer 16 is applied to the front surface 18 of the connection section 12. A back surface 20 of the connection section 12 of the first component 4 serves as a section of the first component 4 to be brought into contact with a pressing section 22 of the module-device 10, which is exemplarily shown in FIG. 4. Thus, the front surface 18 and the back surface 20 of the connection section 12 may be opposite surfaces of the connection section 12.

Figure 4:
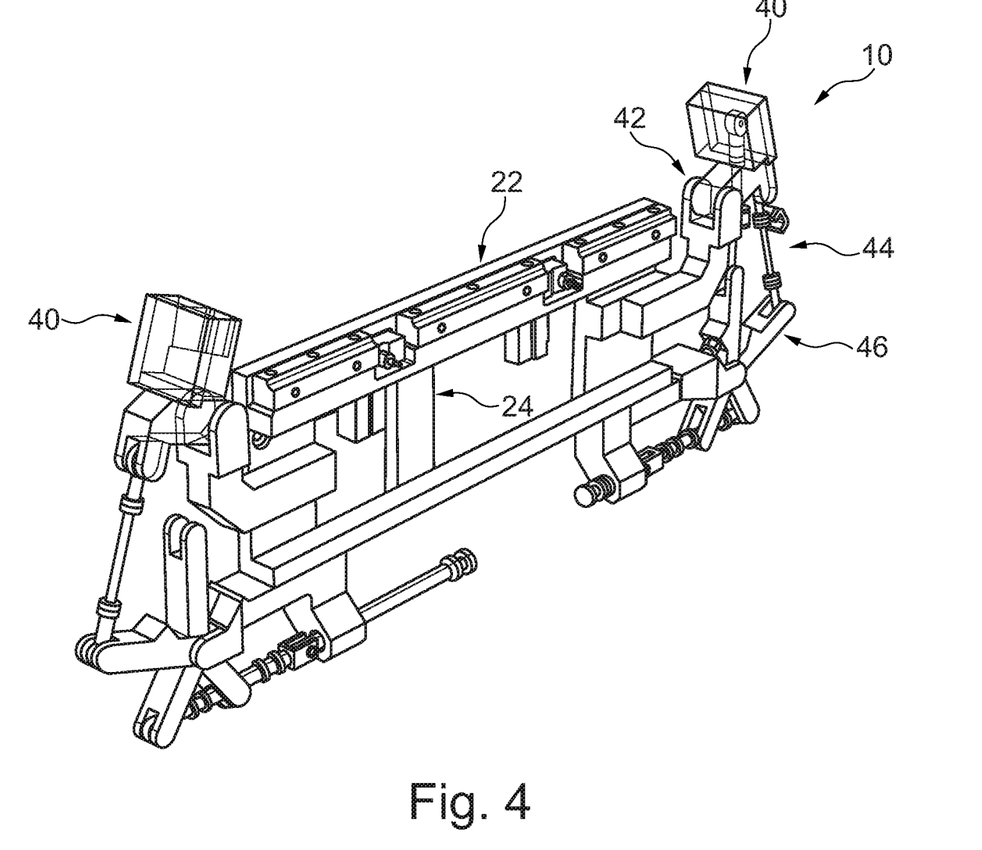
FIG. 4 schematically illustrates an embodiment of the module-device.

FIG. 4 schematically illustrates an embodiment of the module-device 10. The module-device 10 comprises the pressing section 22. As long as the first component is not releasably attached to the pressing section of the module-device 10, the pressing section 22 is arranged to form an outer surface of the module-device 10. Further, the module-device 10 may comprise a frame 24. The pressing section 22 may be connected to the frame 24. Alternatively, the pressing section 22 may be formed by the frame 24 of the module-device 10. Preferably, the frame 24 and/or the pressing section 22 may be made of, in particular stiff, material, such as metal. Thus, the pressing section 22 may provide a stiff basis for the connection section 18 of the first component 4.

The module-device 10 is adapted for releasably receiving the first component 4. In this context, the adaptation of the module-device 10, and in particular of its pressing section 22, is such that the connection section 12 of the first component 4 is releasably attachable to the pressing section 22 of the module-device 10. Thus, the first component 4 may be releasably attached to the pressing section 22 of the module-device. In this context, the attachment of the connection section 12 may be planar with respect to the pressing section 22. Thus, the connection section 12 may be releasably and planar attached with its back surface 20 to the pressing section 22 of the module-device 10, as it is exemplarily shown in FIG. 5.

Figure 6:
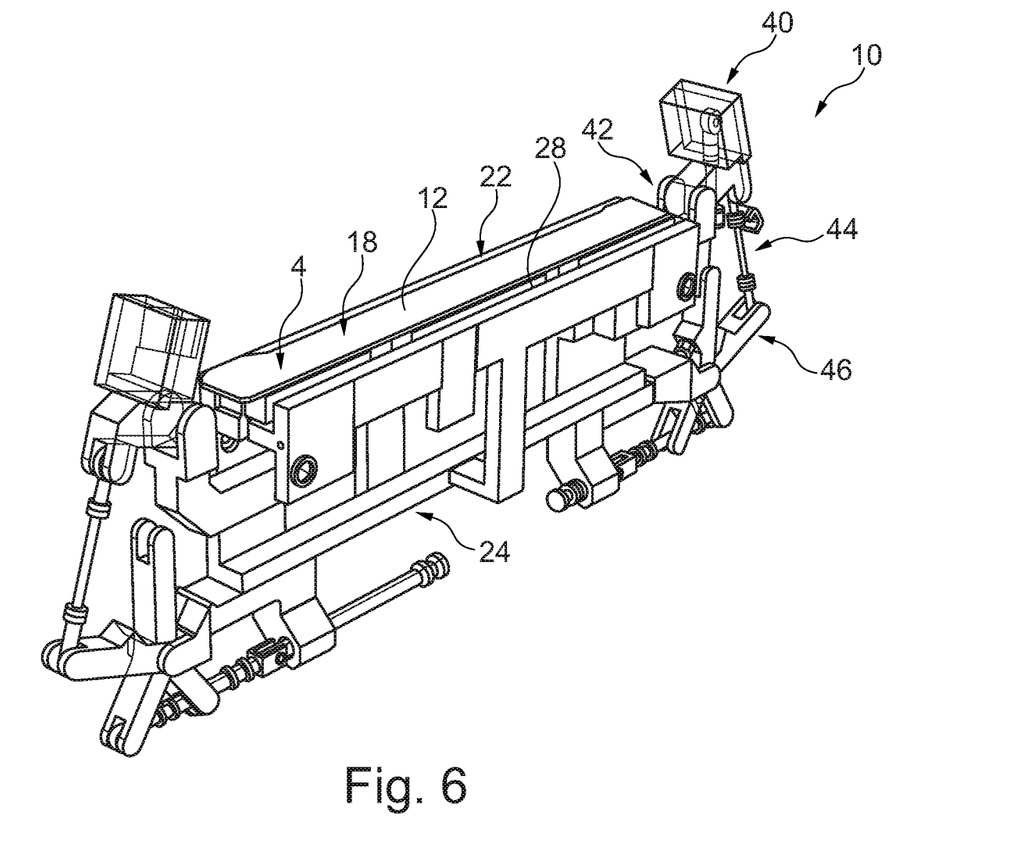
FIG. 6 schematically illustrates a further embodiment of the module-device.

Moreover, the module-device 10 may be releasably connected to the main-device 8. For this purpose, the main-device 8 comprises a grabbing unit 26. The grabbing unit 26 comprises at least a grabbing element 28. The grabbing unit 26 is configured to move the grabbing element 28 in order to grab the module-device 10. For this purpose, the grabbing unit may comprise a linear guide configured to guide the grabbing element 28. Further, the main-device 8 may comprise an attachment section 30 being arranged opposite to the grabbing element 28, wherein the grabbing unit 26 is configured to drive the grabbing element in a direction between the grabbing element 28 and the attachment section 30. The linear guide may be configured to guide the grabbing element in said direction. As a result, a receiving area 32 may be provided between the attachment section 30 and the grabbing element 28, if the grabbing element 28 is driven away from the attachment section 30 by the grabbing unit 26. Thus, the main-device 8 may be moved, such that the module-device 10 is at least partly (relatively) driven into the receiving area 32. Thereafter, the grabbing element 28 may be driven by the grabbing unit 26 towards the attachment section 30, such that the module-device 10 is releasably connected to the main-device 8. In this state, the pressing section 22 of the module-device 10 is arranged to form a first outer surface section 34 of the main-device 8. If the connection section 12 of the first component 4 has been previously attached with its back surface 20 to the pressing section 22 of the module-device 10, the front surface 18 or the adhesive layer 20, respectively, may form the first outer surface section 34 of the main-device 8. Further features of the grabbing unit 26 are exemplarily illustrated in FIG. 6. As can be seen from FIG. 6, the grabbing element 28 is schematically shown. Further elements of the grabbing unit 26 are omitted for this illustration for a better inside view. The grabbing element 28 is brought into contact with the module-device 10, such that the grabbing element 28 clamps the first component 4 to the module-device 10, in particular to the frame 24 of the module-device 10. Therefore, by grabbing the module-device 10, at the same time a fixation of the first component 4 may be established with respect to the module-device 10.

Furthermore, and in particular with respect to FIG. 1, the main-device 8 comprises a connector 36. The connector 36 may be configured as a connector plate. The connector 36 is adapted for being connected to a handling-unit (not shown). The handling-unit may be a robot, in particular a stationary robot. When connecting the handling-unit to the connector 36, the main device 8 and thus the module-device 10 may be driven along any particular trajectory. Therefore, the main-device 8 may be arranged opposite to the second component 6, such that the connection section 12 of the first component 4 or the adhesive layer 16 is positioned opposite to a front surface 38 of the second component 6. Furthermore, the main-device 8 may be arranged, such that the adhesive layer 16 attaches to the front surface 38 of the second component 6. Therefore, the pressing section 22 of the module-device 10 and/or the connection section 12 of the first component 4 are at least indirectly attached to the front surface 38 of the second component 6.

If the first component 4 is indirectly connected with its connection section 12 to the front surface 38 of the second component, such that the adhesive layer 16 is arranged between the front surface 38 of the second component 6 and the front surface 18 of the connection section 12 of the first component 4, the first component 4 and the second component 6 are supposed to be hold in place, in order to fully cure the adhesive layer 16, such that a firmly bonded connection may be provided between the first component 4 and the second component 6. During the curing process of the adhesive layer 16, care is to be taken that their relative position between the first component 4 and the second component 6 remains unchanged. For this purpose, the module-device 10 is configured to be releasably connected to the second component 6. Thus, the module-device 10 may itself connect to the second component 6. If this connection is established, the relative position between the first component 4 and the second component 6 remains unchanged, resulting in a reliable firmly bonded connection between the first component 4 and the second component 6, if said connection remains unchanged until the adhesive layer 16 is fully cured.

As the module-device 10 is configured to be releasably connected itself to the second component 6, the main-device 8 may be disconnected from the module-device, while the module-device 10 is releasably connected to the second component 6. Therefore, the main-device 8 may be used to connect to a further module-device 10. In this context, reference is made to the previous explanation in an analogous manner. After connecting the main-device 8 to a further module-device 10, the main-device 8 may be arranged opposite to a further section of the front surface 38 of the second component 6, in order to attach the adhesive layer 16 of a respective further first component 4 to the front surface 38 of the second component 6. In an analogous manner, the further module-device 10 may connect itself releasably to the second component 6. Thus, two or even module-devices 10, each having received a respective first component 4, may be releasably connected to the second component 6, in order to hold the respective number first components 4 in place with respect to the second component 6 until the respective adhesive layers 16 are each fully cured. As a result, the main-device 8 may be used for handling a plurality of module-devices 10 subsequently. As a further result, the system 2 may be used for producing a new product comprising the second component 6 and a plurality of first components 4 reliably and firmly bonded thereto.

Further, the main-device 8 of the system 2 may be used for arranging each module-device 10 opposite to the second component 6, in order to provide a reliable basis to ensure an unchanged alignment of respective first component 4 with respect to the second component 6. As can be seen from FIGS. 4 and 5, the module-device 10 preferably comprises a clamping arm 40. Even further preferred, the module-device 10 comprises two or more clamping arms 40. Each of the clamping arms 40 may be of the same configuration and/or form. Therefore, even though the module-device 10 may comprise more than one clamping arm 40, further details of the clamping arm 40 are described in the following by focusing on one clamping arm 40. However, the features, effects and/or advantages of the described clamping arm 40 may refer to each of the clamping arms 40 in an analogous manner.

The clamping arm 10 may be swivably, and/or in particular pivotably, connected to the frame 24 of the module-device 10. A respective joint connection 42 between the clamping arm 40 and the frame 24 may be arranged laterally to the pressing section 22 and/or below the clamping section 22. The clamping arm 40 is rotatably connected to an actuation unit 44 of the module-device 10. Thus, the clamping arm 40 may be driven and/or controlled by the actuation unit 44. The actuation unit 44 may comprise a plurality of connection arms 46, being rotatably connected to each other. Furthermore, the actuation unit 44 of the module-device 10 is configured and/or arranged, such that the actuation unit 44 may be connected to a driving unit 48 of the main-device 8. Thus, when releasably connecting the module-device 10 to the main-device 8, a mechanical connection may be, in particular automatically, established between the actuation unit 44 and the driving unit 48. The driving unit 48 may be an electrical, mechanical, hydraulic, and/or pneumatic actuator, or preferably comprising such an actuator. Thus, the actuation unit 44 may be drivable and/or controllable by the driving unit 48, if the module-device 10 is releasably connected to the main-device 8. The actuation unit 44 is connected or linked to the clamping arm 40, such that a swiveling of the clamping arm 40 is controllable and/or drivable by the actuation unit 44. As a result, the clamping arm 40 may by indirectly controllable and/or drivable by the driving unit 48.

Figure 5:
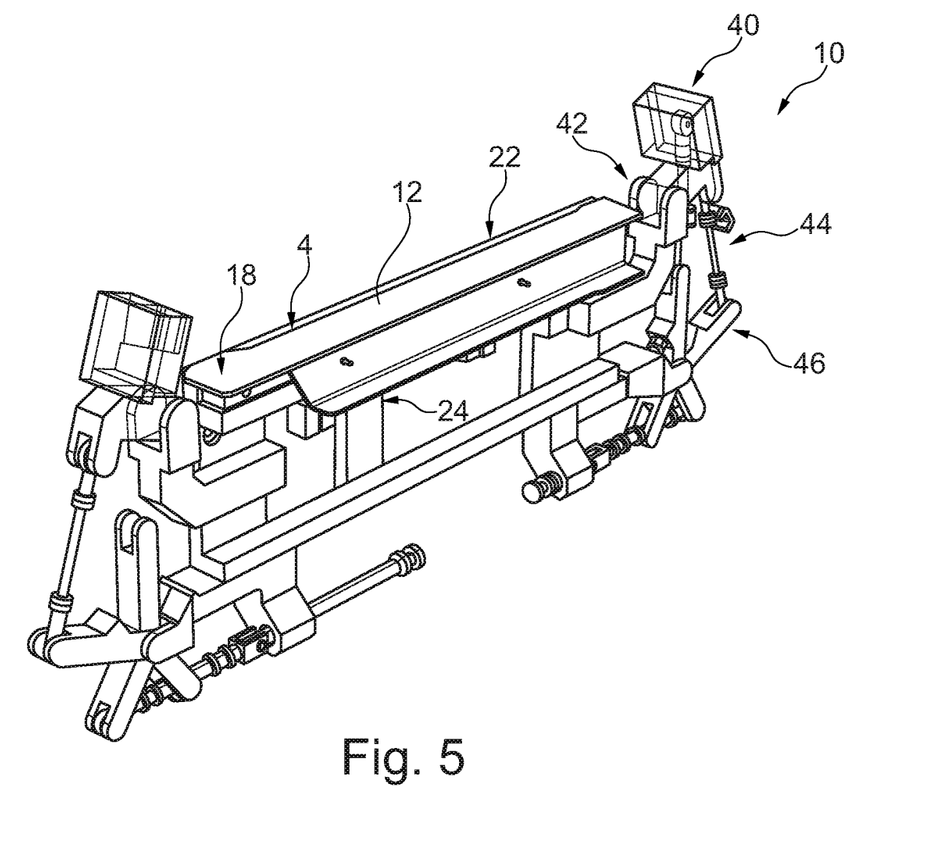
FIG. 5 schematically illustrates a further embodiment of the module-device.

Moreover, the actuation unit 40 may drive the clamping arm 40, such that the clamping arm 40 is swiveled to a first position, a second position, or any position therebetween. In other words, the actuation unit 44 is adapted to swivel the clamping arm 40 at least between the first position and the second position. FIGS. 4 and 5 show the clamping arm 40 in its second position. In the second position, the clamping arm 40 uncovers the pressing section 22 of the module-device 10. In case a first component 4 is releasably attached to the module-device 10, the clamping arm 40 uncovers in its second position the front surface 18 of the connection section 12 of the first component 4, and if an adhesive layer 16 applied to the front surface 18 of the connection section 12, the clamping arm 40 uncovers the adhesive layer 16, if the clamping arm 40 is in its second position. Therefore, if the clamping arm 40 is in its second position, the connection section 12 and/or the adhesive layer 16 may be brought unhindered into contact with the front surface 38 of the second component 6.

FIG. 1 shows a state, where the module-device 10 being releasably attached to the main-device 8 is positioned with respect to the second component 6, such that the connection section 12 of the first component 4 is attached to the second component 6, such that the adhesive layer 16 is arranged in direct contact and between the front surface 12 of the first component 4 and the front surface 38 of the second component 6. Thus, the first component 4 is brought into a position relative to the second position in order to being firmly bonded to the second component 6. Therefore, the clamping arm 40 is swiveled to its first position, as exemplarily shown in FIG. 1. In the first position, the clamping arm 40 encompasses the pressing section 22, the connection section 12 of the first component 4 and the second component 6. Therefore, in the first position, the clamping arm 40 is in overlap with the back surface of the second component 6. Further, the clamping arm 40 is in its second position in an overlap with the second component 6, such that the connection section 12 of the first component 4 and the second component 6 are clamped between the pressing section 22 and the clamping arm 40. As a result, the module-device 10 releasably connects to the second component 6. In other words, the module-device 10 may be clamped to the second component 6 by swiveling the clamping arm 40 into its first position, as exemplarily shown in FIG. 1. Due to this clamping connection, the module-device 10 may hold the first component 4 reliably in place with respect to the first component 6, such that the adhesive layer 16 may be fully cured and in order to provide a reliable firmly bonded connection between the connection section 12 of the first component 4 and the second component 6. Fully curing the adhesive layer 16 may require a certain time period, for instance a couple hours. Thus, the main-device 8 may be detached from the module-device 10 by the grabbing unit 26, while the module-device 10 remains clamped to the second component 6. For detaching the main-device 8, the grabbing element 28 is driven off the module-device 10, such that the main-device 8 is released from the module-device 10. Thereafter, the module-device 8 may be driven away from the module-device 10. The module-device 10 remains in place with respect to the second component 6. Thus, the main-device 8 may be used for grabbing a further module-device 10 in order to perform the procedure of attaching a further first component 4 to the second component 6 in an analogous manner. This may be repeated for a plurality of further module-devices 10 and/or a further plurality of first components 4, respectively.

FIG. 1 further schematically illustrates a vacuuming unit 50 of the main-device 8. The vacuuming unit 50 comprises a plurality of vacuum caps 52. The vacuum caps 52 may be arranged in parallel rows. For instance, a first number of vacuum caps 52 may be arranged in a first row and a preferably equal number of vacuum caps 52 may be arranged in a second row, when the rows are arranged apart from each other, such that the rows of vacuum caps 52 are arranged lateral to the receiving area 32, in particular such that one row is arranged to each lateral side of the receiving area 32. When driving the main-device 8 to being opposite to the front surface 38 of the second component 6, the vacuum caps 52 may be brought into contact with each of their sealing surfaces 52 to the front surface 38 of the second component 6. Furthermore, the vacuuming unit comprises an air connection port, which is in fluid connection with each of an area encompassed by the vacuum cups 52. Thus, when the vacuum cups 52 are attached with their sealing surfaces 54 to the front surface 38 of the second component 6, respective spaces being enclosed by the front surface 38 of the second component 6 and the vacuum caps 52 are in fluid connection with the air connection port. When applying a vacuum air pressure, thus a pressure being below the atmospheric pressure, to the air connection port, the vacuum caps 52 are sucked onto the front surface 38 of the second component 6. Consequently, the vacuuming unit 50 is configured for firmly bonding the main-device 8 to the second component 6.

If the firmly bonded connection between the main-device 8 and the second component 6 is established, the main-device 8 is preferably configured to press the module-device 10 towards the front surface 38 of the second component 6, such that a planar connection between the connection section 12 of the first component 4 and the front surface 38 of the second component 6 is established by the adhesive layer 16. For pressing the module-device 10 towards the second component 6, the main-device 8 preferably comprises a pressing unit, which is adapted for pressing the module-device 10 with its pressing section 22 facing forward away from the main-device 8 and/or towards the second component 6. After finishing said pressing process, the module-device 10 may be clamped to the second component 6 by its clamping arms 40. Thereafter, the main-device 8 may be detached from the module-device 10, in order to repeat a respective process for and/or with a further module-device 10.

Figure 7:
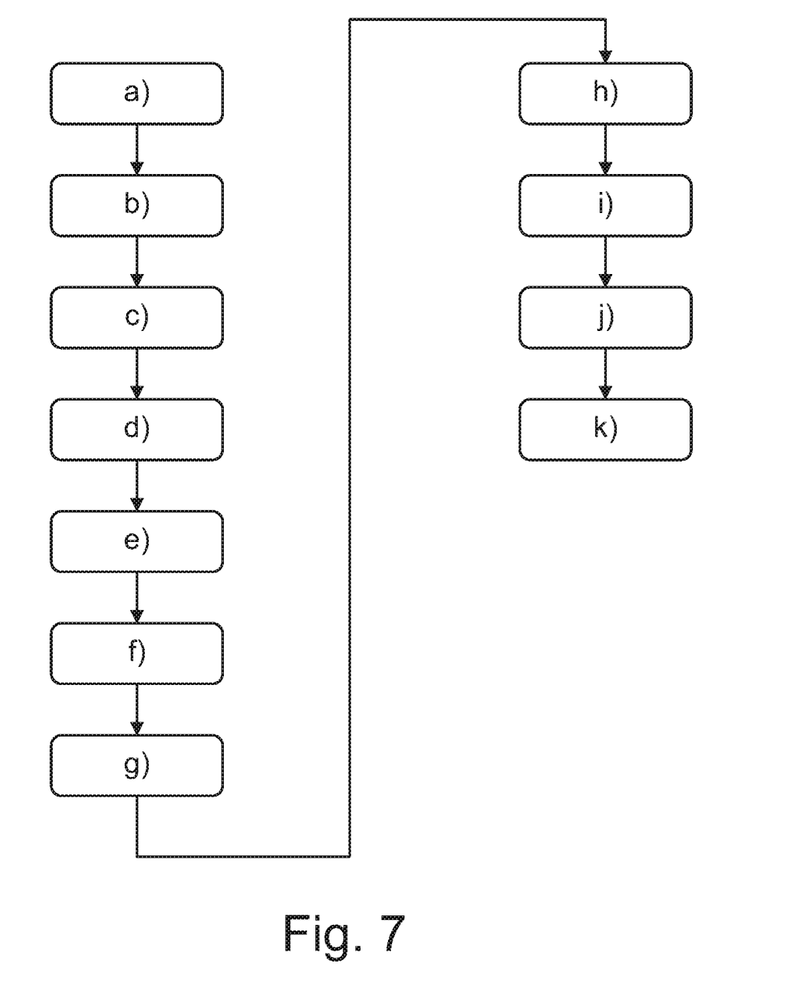
FIG. 7 schematically illustrates a flow chart of the method.

Moreover, embodiments of the invention preferably relate to a method for connecting the first component 4 to the second component 6 by the system 2. An exemplary flow-chart of the method is shown in FIG. 7. According to a preferred embodiment, the method comprises the following steps:

a) Connecting the first component 4 to the module-device 10, such that a connection section 12 of the first component 4 is, in particular planar, attached with its back surface 20 to the pressing section 22 of the module-device 10, wherein an adhesive layer 16 is applied to a front surface 18 of the connection section 12 facing away from the pressing section 22;

b) Coupling the module-device 10 to the main-device 8 by its grabbing unit 26, such that the adhesive layer 16 attached to the connection section 12 of the module-device 10 forms the first outer surface 34 of the main-device 8;

c) Positioning the main-device 8 relative to the second component 6, such that the adhesive layer 16 attached to connection section 12 of the first component 4 is opposite to the front surface 38 of the second component 6;

d) Connecting the first component 4 to the second component 6, such that the front surface 18 of the connection section 12 of the first component 4, having the adhesive layer 16 applied to, is at least indirectly attached to the front surface 38 of the second component 6;

e) Swiveling the or each clamping arm 40 of the module-device 10, such that the or each clamping arm 40 encompasses the second component 6 and releasably attaches to a back surface of the second component 6;

f) Decoupling the module-device 10 from the main-device 8 by its grabbing unit 26;

g) Curing the adhesive layer 16, such that the first component 4 is firmly bonded to the second component 6;

h) Coupling the module-device 10 to the main-device 8 by its grabbing unit 26, after the adhesive layer 16 is cured, in particular fully cured;

i) Retracting the or each clamping arm 40, such that the module-device 10 is released from the second component 6;

j) Detaching the module-device 10 from the first component 4; and k) Moving the main-device 8, and in particular the module-device 10 releasably attached thereto, in a direction away from the bonded components 4, 6.

While embodiments of the invention have been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The mere fact that certain measures are re-cited in mutually different dependent claims does not indicate that a combination of these measures cannot be used to advantage. Any reference signs in the claims should not be construed as limiting the scope.

What is claimed is:

1. A system for handing a first component to be assembled with a second component, the system comprising:
   a main-device comprising:
      a connector configured to connect the main-device to a handling-unit for arranging the main-device at the second component; and
      a grabbing unit; and
   a module-device configured to be releasably connected to the grabbing unit of the main-device, and configured to be releasably connected to the second component, the module-device comprising:
      a pressing section arranged to form an outer surface of the module-device, wherein the module-device is configured to releasably receive the first component such that a connection section of the first component is releasably attachable to the pressing section; and
      a clamping arm configured to releasably clamp the module-device to the second component;
   wherein the main-device is arranged such that, when the first component is attached to the pressing section of the module-device, the connection section of the first component is at least indirectly attachable to a front surface of the second component;
   wherein the clamping arm is actuated into a clamping position to clamp the module-device to the second component such that, when the first component is attached to the pressing section of the module-device, the connection section of the first component is clamped to the front surface of the second component; and wherein the clamping arm locks in the clamping position such that the module-device and the first component remain clamped to the second component after disconnection of the main-device from the module-device.

2. The system according to claim 1, wherein the system comprises the handling-unit.

3. The system according to claim 1, wherein:
the main-device comprises a driving unit;
the module-device comprises an actuation unit being connectable, controllable, and/or drivable by the driving unit;
the actuation unit is adapted to swivel the clamping arm at least between the clamping position and a second position;
in the clamping position, at least a part of the clamping arm is arranged in overlap with the pressing section; and
in the second position, the clamping arm uncovers the pressing section to accommodate attaching the connection section of the first component, if attached to the pressing section, at least indirectly to the front surface of the second component.

4. The system according to claim 3, wherein the driving unit of the main-device and the actuation unit of the module-device are adapted, such that the driving unit connects to the actuation unit to drive the actuation unit, when the module-device is connected to the main-device.

5. The system according to claim 3, wherein the actuation unit is configured to lock the clamping arm in the clamping position.

6. The system according to claim 1, wherein:
the main-device comprises a vacuuming unit with an air connection port providable with a vacuum air pressure; and
the vacuuming unit is configured to suck onto the front surface of the second component, when a sealing surface of the vacuuming unit is attached to the front surface of the second component and the vacuum air pressure is applied to the air connection port.

7. The system according to claim 1, wherein the main-device comprises a pressing unit configured to press the module-device with the pressing section facing forward in a pressing-direction away from the main-device.

8. The system according to claim 7, wherein the main-device comprises a sensor configured to at least indirectly detect a force, which may be applied by the pressing unit to the module-device.

9. The system according to claim 8, further comprising a control unit connected via a signal connection to the sensor, wherein the sensor is configured to transmit a sensor signal, representing the force, to the control unit, and wherein the control unit is configured to control the pressing unit based on the sensor signal.

10. The system according to claim 9, wherein the control unit is configured to control the pressing unit, such that the force corresponds to a predefined reference force.

* * * * *